United States Patent [19]

Isler

[11] Patent Number: 5,799,876

[45] Date of Patent: Sep. 1, 1998

[54] EXTERNAL MIXED PLURAL COMPONENT SPRAY GUN

[75] Inventor: Bobby G. Isler, Lady Lake, Fla.

[73] Assignee: Martin Marietta, Bethesda, Md.

[21] Appl. No.: 454,944

[22] Filed: May 31, 1995

[51] Int. Cl.$^6$ ............................................. B05B 7/04
[52] U.S. Cl. .................... 235/306; 239/407; 239/526; 239/DIG. 14
[58] Field of Search .................................. 239/112, 407, 239/413, 414, 526, 8–10, DIG. 14, 304–306, 422, 423, 428, 424, 424.5

[56] References Cited

U.S. PATENT DOCUMENTS

| | | | |
|---|---|---|---|
| 2,297,497 | 9/1942 | Popoff | 239/424 X |
| 2,335,116 | 11/1943 | Hansen | 239/306 X |
| 2,356,865 | 8/1944 | Mason | 239/DIG. 14 X |
| 2,819,928 | 1/1958 | Liedberg | 239/304 |
| 2,864,653 | 12/1958 | Liedberg et al. | 239/424 X |
| 2,969,926 | 1/1961 | Peeps | 239/526 X |
| 2,971,700 | 2/1961 | Peeps | 239/424 X |
| 3,074,651 | 1/1963 | Agosti et al. | 239/304 |
| 3,179,341 | 4/1965 | Plos et al. | 239/414 |
| 3,302,891 | 2/1967 | Faro et al. | |
| 3,338,523 | 8/1967 | Tibbitt | 239/413 |
| 3,458,138 | 7/1969 | Yankee | 239/428 X |
| 3,541,023 | 11/1970 | Cole, III. | |
| 3,606,170 | 9/1971 | Hoffman et al. | 239/414 |
| 3,807,641 | 4/1974 | Albright | 239/407 |
| 4,117,551 | 9/1978 | Books et al. | 239/414 |
| 4,193,546 | 3/1980 | Hetherington et al. | 239/112 |
| 4,213,936 | 7/1980 | Lodrick | 239/416.1 |
| 4,278,205 | 7/1981 | Binoche | 239/75 |
| 4,568,003 | 2/1986 | Sperry et al. | 239/112 X |
| 5,086,949 | 2/1992 | Vulpitta et al. | 222/1 |
| 5,170,939 | 12/1992 | Martin | 239/112 |

OTHER PUBLICATIONS

Binks Spray Systems Catalog PD-1, p. 17, Model 18d.

*Primary Examiner*—Lesley D. Morris
*Attorney, Agent, or Firm*—Burns, Doane, Swecker & Mathias, LLP

[57] ABSTRACT

A multiple material spray system and method are provided for applying a spray by a single component spray gun. A first material is fed through a tube injector connected to an external port of the single component spray gun and a conventional fluid section feeds a second material through the single component spray gun without being exposed to the first material. A mixing area is positioned to receive the first and second materials outside of the single component spray gun so that these materials can be externally mixed immediately before applying a spray. The external mixing of the materials permits a spray of high viscosity, low VOC materials with fast gel times of approximately 20 to 40 seconds to be used because gelation in the single component spray gun is prevented by the external mixing. Also, the system and method reduce the number of components so that a more cost-effective process is achieved.

20 Claims, 3 Drawing Sheets

EXTERNAL MIXED PLURAL COMPONENT SPRAY GUN

BACKGROUND OF THE INVENTION

The present invention relates to an external mix plural component spray gun for applying a spray by using a single component spray gun. More particularly, the present invention relates to a system for applying a high viscosity, low VOC material by external mixing to prevent gelation in the spray gun.

Presently, known coating systems for high build, low density coatings require intricate components which lead to a complicated system. As a result, the manufacturing costs and time are increased in the application of high build coating and high density materials due to the complexity. One way to reduce the complexity of the system, and thereby the manufacturing costs and time, is to use a stock spray gun capable of simultaneously spraying multiple components for a spray which provides thickness and surface finish control at a high precision. To further reduce the manufacturing costs and time, a simultaneous multiple component spray system should be easily incorporated into a robotic operation.

Examples of known spray systems include a plural component dispensing apparatus of Vulpitta et al. (U.S. Pat. No. 5,086,949) and a dispensing gun of Hetherington et al. (U.S. Pat. No. 4,193,546). In Vulpitta et al., a complicated flush/purge system must be used for cleaning the apparatus. An aqueous cleaning medium is used by this flush/purge system which requires a stream separator having a gas flow system for each component that must be directed through the passageways to dry out the aqueous cleaning medium for preventing the aqueous medium from reacting with the polyol components. Since water instantly reacts with Isocyanate and ruins the material, it is necessary to completely dry out the passageways after supplying the aqueous cleaning medium. Also, the required purge operation introduces hazardous and dangerous solvents into the spray area. Similarly, the dispensing gun of Hetherington et al. has complicated purging and flushing systems for cleaning the material flow control valves in the mixing body passageways. Such flush and purge systems as disclosed by Vulpitta et al. and Hetherington et al. make the system complicated to operate, maintain and supply material. Therefore, the known spray systems have high manufacturing costs and time due to this complexity.

When using materials having very fast gel times, careful attention must be made to prevent the fluid passages and fluid lines of the spray gun from becoming clogged. In the use and application of high viscosity, low VOC materials, fast gel times of approximately 20 to 40 seconds are present which makes it necessary to constantly check and ensure that the fluid passages and lines are clear. Typically, the materials are internally mixed in the spray gun. However, internal mixing creates a build-up from extended use by clogging the fluid passages and fluid lines which will eventually make the spray gun inoperable. When multiple materials are internally mixed in known systems, such as Vulpitta et al. and Hetherington et al. for example, this clogging problem results.

The additional complexity of known spray systems results from equipment and processing factors such as pressure pots, a large number of hoses, mixing equipment and procedures performed in a large area needing many people which are generally required. Therefore, a spray system is desired which reduces this complexity. It is also desirable to design spray systems for their expanding use in robotic operations. Accordingly, when considering spray systems for use in robotics, it is critical to reduce the size, weight and number of components of the spray system.

SUMMARY OF THE INVENTION

An object of the present invention is to provide a multiple material spray system and method for simultaneously applying a plurality of fast gel time materials by externally mixing the materials from a single component spray gun.

Another object of the present invention is to create a multiple material spray system and method which is compatible with robotic operations.

A further object of the present invention is to provide a multiple material spray system and method which reduce the number of components and operation time so that a less complicated and more cost effective system and method are used.

These objects of the present invention are fulfilled by providing a multiple material spray system for applying a spray by a single component spray gun comprising a tube injector connected to an air port of the single component spray gun for feeding a first material therethrough, a fluid section disposed in the single component spray gun for feeding a second material therethrough without being exposed to the first material, and a mixing area positioned to receive the first and second materials from the tube injector and the fluid section outside of the single component spray gun for externally mixing the first and second materials immediately before applying the spray.

In a preferred embodiment, the first material comprises an isocyanate catalyst and the second material comprises polyol resin. Accordingly, the resulting spray is a high viscosity, low VOC material having a fast gel time of about 20 to 40 seconds so that the applied spray develops a high build, low density coating.

Also, in a preferred embodiment, a solvent flush tube is positioned in-line with the tube injector for applying a solvent flush to fluid passages and lines which purges materials in the single component spray gun.

In another preferred embodiment, the single component spray gun is a Binks Model 18D spray gun or a Grayco Model 204 spray gun.

The multiple material spray system and method allows more than one material to be simultaneously applied as a result of the external mixing of the materials outside of the body of the single component spray gun so that materials having fast gel times can be used. This concept may be applied to many spray systems and methods for providing a wide range of applications and an extensive period of pick-up, spray and flush while remaining in a state of readiness. Furthermore, to be more compatible with robotic operation, the number of material buckets, hoses, drums, mixers and support equipment, which are required in known spray systems, has been reduced by the present system and method. These reductions also reduce manufacturing time and cost for the present system and method. In addition, true low VOC materials are used because materials do not have to be thinned in order to spray them. The present system and method further reduce damage to sensitive components as a result of less handling requirements.

Further scope of applicability of the present invention will become apparent from the detailed description given hereunder. However, it should be understood that the detailed description and specific examples, while indicating preferred embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, where.

DESCRIPTION OF THE PREFERRED EMBODIMENTS

Figure 1:
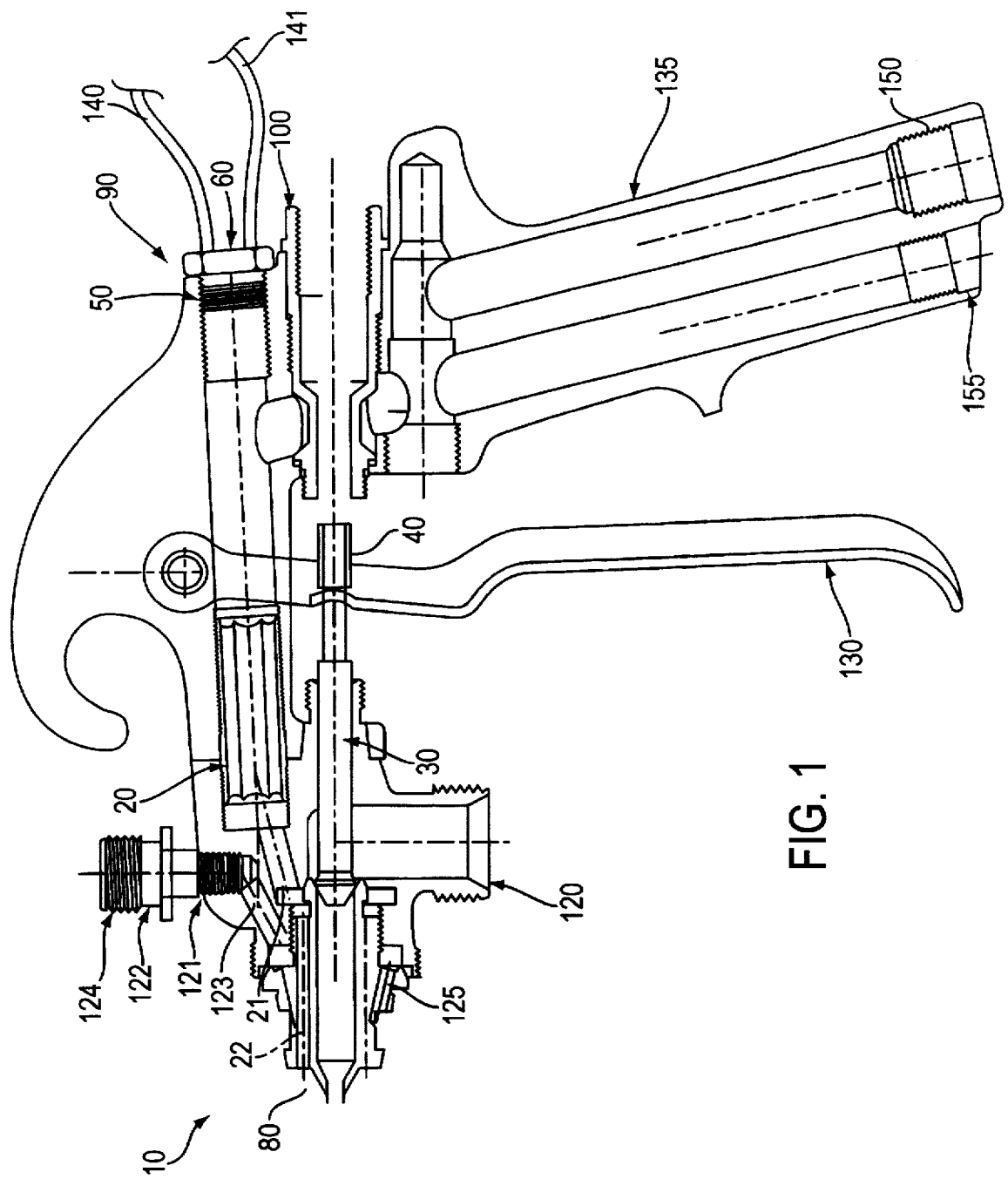
FIG. 1 illustrates a single component spray gun used for a multiple material spray system in one embodiment of the present invention.

FIG. 1 illustrates one embodiment of the present invention for a single component spray gun 10 which may be used in a multiple material spray system. The single component spray gun 10 includes a tube injector 140 connected to an external port 90 of the single component spray gun 10 for feeding a first material to a first material passageway 20. The tube injector 140 may be connected to external port 90 by a plug 50 and a fluid coupler 60. The multiple material spray system further includes a fluid section 120 having a side port 121, a fluid control stem 40, which is positioned within a material control housing 100, and a stub shaft 30 for feeding a second material through the single component spray gun 10. The spray system also includes a body 135 with an air/catalyst material inlet 150 and a flushing agent inlet 155 in the present embodiment. The gun body 135 used is preferably a stock part which has all of the threaded openings hardened by enlarging and tapping in threads and fabricating inserts for each opening. In a preferred embodiment, the inserts may be made from stainless steel. As a result, the gun body will be strengthened and the useful life of the gun body 135 will be greatly increased. The fluid section 120 is disposed so that the second material is fed without being exposed to the first material from the tube injector 140 through first material passageway 20.

The fluid section 120 functions to isolate air at the side port 121 from the air/catalyst material mixture within the fluid section 120. The multiple material spray system also includes a mixing area 80 for externally mixing the first and second materials outside of the body of the single component spray gun 10 immediately before applying the spray. The mixing area 80 is disposed within an air nozzle/cap assembly 70 (see FIG. 2) so that the first and second materials are received from the tube injector first material passageway 20 and the fluid section 120 outside of the single component spray gun 10. The first material passageway 20 is connected with mixing area 80 through passageways 21 and 22. Also, an air inlet 124 and an adaptor 122 may be provided at side part 121 for receiving the air supply. Air inlet 124 and adapter 122 are connected with mixing area 80 through passageways 123, 125.

The multiple material spray gun in a first embodiment of the present invention initiates the reaction between the first and second materials outside of the single component spray gun 10, which prevents reactions between the materials from occurring inside of the body of the single component spray gun 10. When spraying high viscosity, low VOC materials with fast gel times, external mixing should be used to prevent gelation inside of the body of the single component spray gun 10. For example, when an isocyanate catalyst is used as the first material and a polyol resin is used as a second material, these materials will gel in approximately 20 to 40 seconds which would fatally clog the fluid passages and fluid lines in the body of the single component spray gun 10. By keeping the first and second materials separated until immediately before applying the spray, gelation is greatly reduced in the body of the single component spray gun 10.

The tube injector 140 may be custom fitted to feed the first material (the isocyanate catalyst, for example) via external port 90 of the single component spray gun 10 in the embodiment illustrated in FIG. 1. Alternatively, the tube injector 140 may include a plurality of tubes 140, 141 for injecting more than one material. The second material is fed through the fluid section 120 of the single component spray gun 10 in response to the fluid control stem 40 and the stub shaft 30, which is controlled by a trigger 130 in the present embodiment. For unusual applications of spray systems, such as when one material side has is at a viscosity at 20,000 centipoise and the other material side has is at a viscosity of 50 centipoise, external mixing should be used for a plural component spray gun to develop and apply a high build, low density coating.

There are many single component spray guns that may be modified to provide external mixing for a multiple material spray system. One such spray gun that is particularly suitable for being converted to a multiple material spray system is the Binks Model 18D spray gun. In the Binks Model 18D spray gun, a plugged fan side or air inlet is replaced with a custom fitted tube injector 140 at fluid coupler 6 to allow the introduction of the first material. In the Binks Model 18D spray gun, the air parts should be connected to utilize the multiple component delivery.

In the embodiment of FIG. 1, a feed line for the first material may be connected with the fluid coupler 60 for bringing in the first material. The feed line for the first material feed line is also used to bring in the solvent for purging the materials in the single component spray gun 10 in order to reduce the amount of gelation. In another embodiment where the multiple spray system is to be compatible with robotic automation, the solvent flush is placed in-line with the first material feed line in order to reduce the amount of space which is desired for use in robotic systems.

Figure 2:
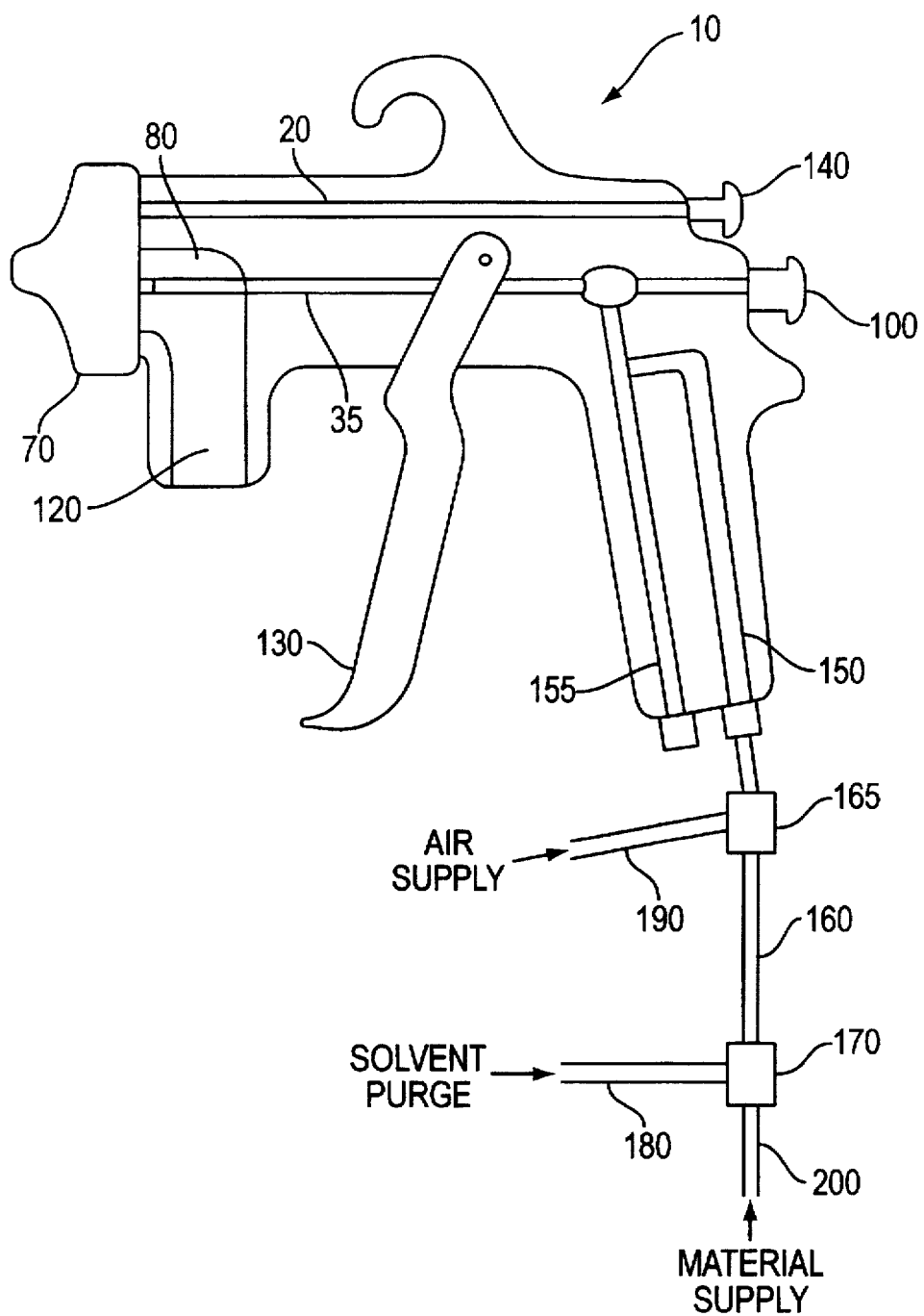
FIG. 2 illustrates a single component spray gun used in a multiple material spray system for another embodiment of the present invention.

FIG. 2 illustrates another embodiment of the present invention which uses a bottom material feed with air assist for the first material in contrast to the rear material feed of the first material for the embodiment illustrated in FIG. 1. The same reference numerals will be used when referring to similar elements of FIG. 1.

In the second embodiment, the single component spray gun 10 includes a tube injector 140, a fluid section 120, a fluid needle rear seating and control stem 35, and a material control housing 100. The tube injector 140 may be connected to a feed line 160 at an external port 150. The feed line 160 is capable of providing an air supply 190, a solvent purge supply 180, and a first material supply 200 by selection of these lines with valves 165 and 170. The fluid needle rear seating and control stem 35 is shown in the present embodiment in place of the stub shaft used in the embodiment of FIG. 1. Although the use of a stub shaft is preferable to prevent clogging by trapping filler materials, the use of the fluid needle rear seating and control stem 35 in the present embodiment illustrates that many various spray gun designs may be modified to multiple material spray systems. A bottom material feed with air assist spray gun, which is particularly suitable for use as the single component spray gun 10 in the present embodiment, is a Grayco Model 204 spray gun. However, other types of single component spray guns may be similarly modified to provide external mixing for multiple material spray systems.

Figure 3:
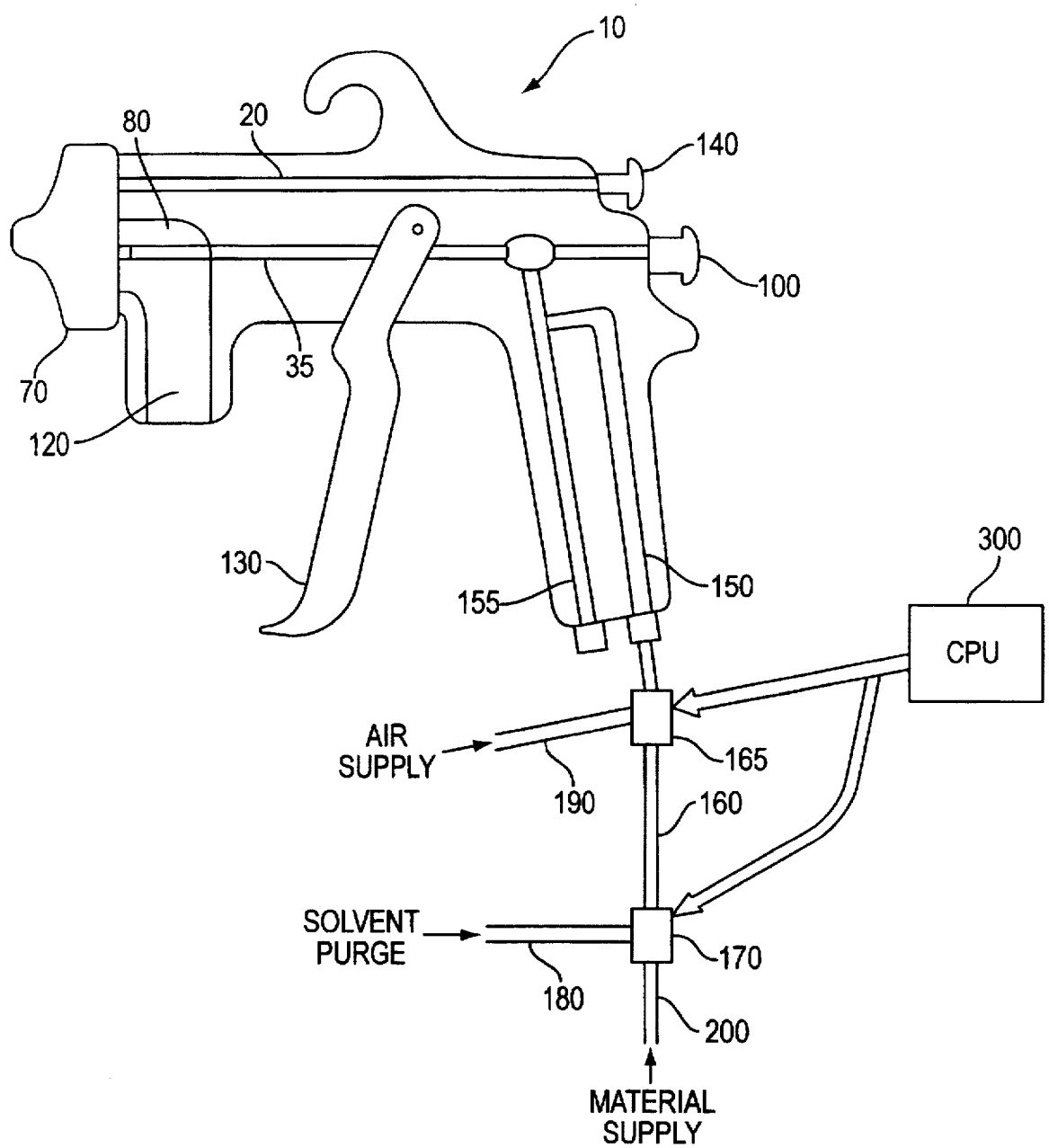
FIG. 3 illustrates a flow system which controls the materials input to the multiple material spray system.

In a further embodiment of the present invention, the multiple material spray system may be controlled by a closed loop computerized flow system having all of the valves in a remote location. FIG. 3 illustrates a controller 300 which operatively communicates and controls the material feed by the valves 165 and 170 for the present embodiment. The controller 300 may be a central processing unit (CPU) which is programmed to control the valves as desired. Such a controller may be implemented in many types of flow systems to control the valves. As a result, an operator of the system does not need to worry about the timing for opening and closing valves and switches.

The invention being thus described, it would be obvious that the same may be varied in many ways. Such variations are not to be regarded as a departure from the spirit and scope of the invention and all such modifications as would be obvious to one skilled in the art are intended to be included within the scope of the following claims.

What is claimed:

1. A multiple material spray system for applying a spray by a single component spray gun comprising:
    a single component spray gun body including a first entry port for feeding a first material therethrough, a second entry port in fluid communication with said first entry port, an exit port in fluid communication with said first entry port and said second entry port, and a plurality of tube injectors connected to said first entry port for feeding a plurality of first materials therethrough;
    a fluid section connected to said body at said exit port, said fluid section including a third entry port for feeding a second material therethrough;
    said fluid section further comprising first and second passageways to receive said first and second materials from said exit port and said third entry port outside of the single component spray gun body, said first and second passageways for maintaining said first and second materials mutually isolated and for delivering said first and second materials for mixing exteriorly of said single component spray gun body and of said fluid section immediately before applying the spray.

2. A multiple spray system according to claim 1, further comprising said first and second materials, wherein said first material comprises an isocyanate catalyst and said second material comprises polyol resin.

3. A multiple spray system according to claim 2, wherein the spray is a high viscosity, low VOC material having a fast gel time.

4. A multiple spray system according to claim 1, wherein the single component spray gun comprises a Binks Model 18D spray gun, or a Grayco Model 204 spray gun.

5. A multiple spray system according to claim 3, wherein said fast gel time of the spray is about 20 seconds to about 40 seconds.

6. A multiple material spray system according to claim 1, wherein the spray can be applied to develop a high build, low density coating.

7. A multiple spray system according to claim 1, further comprising a solvent flush tube in fluid communication with said first entry port for applying a solvent flush to said body and for purging materials in the single component spray gun body.

8. A method for applying a spray of multiple materials by a single component spray gun, comprising the steps of:
    feeding a plurality of first materials through the body of a single component spray gun by a plurality of tube injectors connected to an external port of the single component spray gun body;
    feeding a second material through a fluid section connected to the single component spray gun so that said first and second materials are not exposed to each other in said fluid section;
    mixing said first and second materials exteriorly of said body and said fluid section in a mixing area positioned to receive said first and second materials from said fluid section immediately before applying the spray.

9. A method for applying a spray of multiple materials according to claim 2, wherein said first material comprises an isocyanate catalyst and said second material comprises polyol resin.

10. A method for applying a spray of multiple materials according to claim 2, wherein the spray is a high viscosity, low VOC material having a fast gel time.

11. A method for applying a spray of multiple materials according to claim 2, wherein the single component spray gun comprises a Binks Model 18D spray gun or a Grayco Model 204 spray gun.

12. A method for applying a spray of multiple materials according to claim 11, wherein said fast gel time of the spray is about 20 seconds to about 40 seconds.

13. A method for applying a spray of multiple materials according to claim 8, wherein the spray is applied to develop a high build, low density coating.

14. A method for applying a spray of multiple materials according to claim 8, further comprising the step of:
    in-line flushing fluid passages and lines of said body with a solvent to purge materials in the single component spray gun.

15. A multiple material spray system according to claim 1, further comprising an air nozzle/cap assembly connected to said fluid section to allow mixing of said first material and said second material outside of said fluid section.

16. A multiple material spray system according to claim 7, further comprising:
    a feed line connected to the single component spray gun body for supplying said first material.

17. A multiple material spray system according to claim 16, wherein said feed line is connected to said solvent flush tube to supply said solvent to purge materials in the single component spray gun body.

18. A multiple material spray system according to claim 1, wherein each of said plurality of tube injectors includes a corresponding valve.

19. A multiple material spray system according to claim 18, further comprising a controller for opening and closing the valves.

20. A multiple material spray system according to claim 1, wherein said fluid section further comprises a fourth material entry port and passageways to supply a fourth material through said fluid section for mixing with said first material exteriorly of said single component spray gun body and said fluid section immediately before applying the spray.

* * * * *

UNITED STATES PATENT AND TRADEMARK OFFICE
CERTIFICATE OF CORRECTION

PATENT NO. : 5,799,876
DATED : September 1, 1998
INVENTOR(S) : Bobby G. ISLER

It is certified that error appears in the above-identified patent and that said Letters Patent is hereby corrected as shown below:

Column 3, line 63, change "part" to --port--;

Column 4, line 25, change "at" (second occurrence) to --of--; and line 36, change "6" to --60--.

Signed and Sealed this

Twenty-seventh Day of July, 1999

Attest:

Q. TODD DICKINSON

*Attesting Officer*      *Acting Commissioner of Patents and Trademarks*